United States Patent Office 3,848,050
Patented Nov. 12, 1974

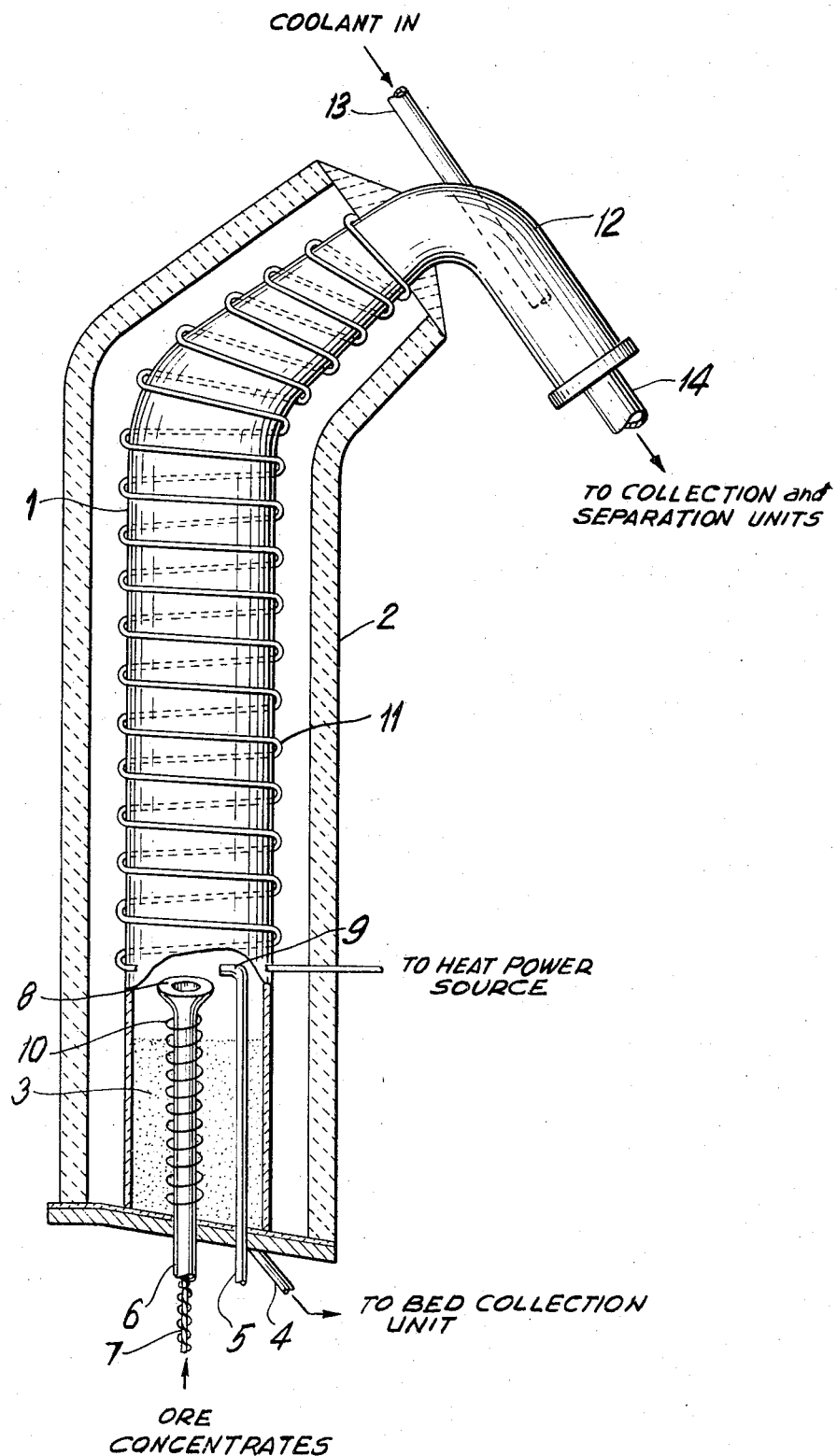

3,848,050
PROCESS OF PREPARING MOLYBDENUM
TRIOXIDE BY SUBLIMATION
Emile Joseph Jemal, 67 Davenport Road,
Yonkers, N.Y. 10710
Filed July 5, 1972, Ser. No. 269,064
Int. Cl. C01g 39/00
U.S. Cl. 423—59
6 Claims

ABSTRACT OF THE DISCLOSURE

A process for preparing highly pure metallic compounds (suitably $MoO_3$) by oxidation-sublimation of metal-bearing ore concentrates of —20 mesh size with, for example, oxygen, which process utilizes the "candle effect" of contacting continuously the ore, preheated to 600–700° F., with oxygen to cause instantaneous sublimation. The sublimate, $MoO_3$, and $SO_2$ are the only products of reaction which rise in the reaction vessel, maintained at 1600–1700° F., and are then contacted with liquified $SO_2$ and collected. The non-sublimable constituents of the feed, introduced by a screw-feeder onto a cup-shaped vessel, fall to the bottom of the reactor whence they are continuously removed by mechanical means.

FIELD OF THE INVENTION

This invention relates to a process for producing highly pure metallic compounds by sublimation. More particularly, the invention is directed to the preparation of highly pure molybdenum trioxide by sublimations of molybdenum-bearing ore concentrates, especially those containing a high percentage of molybdenum disulphide.

DESCRIPTION OF THE PRIOR ART

Although the process is applicable to other materials, the invention will be described solely with reference to the preparation of molybdenum trioxide.

Molybdenum is a very versatile and important element which has many laboratory and industrial applications. Some of these require molybdenum or molybdenum salts of a high degree of purity. Molybdenum trioxide is particularly valuable in that it can be readily reduced to metallic molybdenum.

The most common source of molybdenum is molybdenite, which may be concentrated by flotation processes to obtain a crude material containing molybdenum disulphide. However, this crude material contains numerous impurities such as iron oxides and sulphides, silica, sodium and potassium salts, oils from the flotation process and other elements such as arsenic, bismuth, antimony, phosphorus, and copper in various forms. In the conventional roasting processes which are employed to convert the sulphide into the oxide, gasses such as sulphur dioxide and sulphur trioxide are given off and small amounts of sulphuric acid are formed. These add to the difficulties encountered in obtaining pure molybdenum trioxide.

Furthermore, the problem of air pollution is not solved by these roasting processes. Much of the pollution may be traced to these conversion processes which allow enormous quantities of sulphur dioxide, sulphuric acid, sulphur trioxide, arsenic, and other contaminants to leave the roaster and be vented through the surrounding atmosphere. Typical of these processes, which are endowed with such environmental disadvantages, are fully described, for example, in U.S. Pat. 2,958,587 to George R. Grimes and in U.S. Pat. 2,958,588 to Jack M. Noy et al.

Molybdenum trioxide has recently been prepared by further improved processes which involve the steps of roasting molybdenite concentrates to obtain crude molybdenum trioxide which is sublimed and collected in bag filters. These roasting processes have been carried out in various types of equipment such as Herreshoff furnaces, rotating cylinders and doughnut-shaped hearths, while a stream of hot air is passed over a bed of the crude material to sweep away the molybdenum trioxide which is formed and sublimed.

Molybdenum trioxide begins to effectively sublime near its melting point. This places severe restrictions on the conditions that may be used in some of the prior art processes. If the temperature is too low, the sublimation will be incomplete, and if too high, the material will melt in the apparatus. As a result, much of the molybdenum trioxide is left behind in the roasted residue which must be given additional treatment if this valuable material is to be fully recovered. In any event, the yields of these prior art processes are notoriously low.

In addition, sulphur dioxide and trioxide gases are formed during the roasting process and these are highly corrosive to the apparatus. At lower temperatures the sulphur trioxide combines with water vapor to form sulphuric acid which tends to be absorbed upon the molybdenum trioxide which is condensed and collected by the bag filters. Even if the purity of the product is improved, the pollution problem has not been solved by such processes.

An even more advanced process is described in U.S. Pat. 3,139,326 to Walter H. Costello, which process may be used to obtain molybdenum trioxide of high purity, in high yields and at low cost from readily obtainable, but impure, molybdenum concentrates. This process combines the separate roasting and sublimation steps of the prior art processes into a single flash oxidation-sublimation step. However, the apparatus of this patent is not free from plugging problems, nor from entrainment of impurities. It uses an excess of air to cool off the reaction, which in turn causes an excessive dilution of the sulphur oxides and the resultant pollution of the surrounding atmosphere. Thus, not only from certain operational reasons, but also from a health-hazard viewpoint, this process is not the proper solution to the problem of molybdenum trioxide recovery without venting of noxious by-products.

BRIEF SUMMARY OF THE INVENTION

The above disadvantages of the prior art processes, both operational and environmental, are overcome by the present invention which exploits a number of physical axioms heretofore gone unheeded.

The process of the present invention employs the commonly known "candle effect," by which an extremely low dust content in the sublimed vapors of molybdenum trioxide is collected, only molybdenum trioxide and sulphur dioxide being removed from the reactor zone and collected.

Briefly stated, the present invention employs a substantially goose-necked reactor, made preferably of quartz-like material, into the bottom of which are introduced through separate inlets the molybdenite concentrates in comminuted form and the reactant oxidizing agent. The feed is continuously introduced by means of a screw feeder through a conduit which terminates into a cup-shaped vessel, the molybdenite particles being introduced at a temperature, for example, of between 600–700° F. The combustion agent, such as oxygen, for example, is introduced through a separate but preferably parallel conduit at a temperature varying between ambient and 400° F. and comes into contact with the molybdenite particles in the region of the cup-shaped vessel. The bottom of the furnace is sealed, for example, by means of zircon sand or the like. The walls of the reactor in the reacting zone are heated by, for example, electric heating elements and are maintained at a temperature of between 1600–1700° F. or higher. Furthermore, the reaction tube is insulated properly from the surrounding atmosphere in order to minimize heat losses, the insulating material being brick or other material well known in the art. As the molybdenite particles come into contact with the oxidizing agent, sublimation takes place and only the vapors of molybdenum trioxide and sulphur dioxide rise to the goose-neck portion of the reaction tube. All other impurities and material components of the molybdenite feed, which do not sublime at the operating temperature, fall out of the cup-shaped vessel and onto the sealing bed of the reactor mostly as ash and are removed from the reactor as need be. Removal of the ashy components may be carried out in accordance with known techniques. A preferred method, however, comprises the continuous withdrawal by means of an eccentric mechanism which, while maintaining a constant level of sealing material, prevents heat losses and the escape of gaseous compounds from the bottom of the reactor.

The vapors of molybdenum trioxide and sulphur dioxide, upon leaving the top of the reactor are cooled by a stream of liquid sulphur dioxide and condensed. In a variance of the present invention, it is possible to substitute the liquified sulphur dioxide coolant with a bed of molybdenum pellets, through which the rising vapors pass and are forced to cool. From the reactor the condensable vapors are introduced into conventional collecting and recovery units.

The apparatus of the present invention may, generally, be employed in any recovery process where the product to be recovered is one which sublimes. It will be necessary only to change such parameters as feed/reactant ratio, type of reactant and temperature of reaction. For example it is possible to employ the "candle effect" of the present process and the reactor of the present invention in recovering wurtzite, zincite, tellurite, sylvite, lawrencite, greenockite and other sublimable ore materials.

THE DRAWINGS

In order that the invention might be more clearly understood, reference is made to the accompanying drawing which is a perspective, elevational view, partly in cross-section, of a reactor or furnace such as may be used in practicing the present invention.

DETAILED DESCRIPTION OF THE INVENTION

Referring now to the single accompanying drawing, the apparatus of the invention consists of a reactor 1, made preferably of such material as quartz or the like, which has a lower, preferably cylindrical portion and an upper substantially goose-necked region. Surrounding the reactor 1 and somewhat spaced therefrom, there is a suitable thickness of insulation 2 for the purpose of maintaining the reactor's temperature uniform throughout and to minimize heat losses. The bottom 3 of the reactor tube is sealed with a bed of such material as, for example, zircon sand, the seal being continuously self-renovating by the falling onto the bed of non-sublimable components of the feed. The ash-like components of the sealing bed are removed, for example, by means of an eccentric and withdrawn from outlet 4, as illustratively shown. Other removal techniques are, however, suitable to the process. Through the bottom of the reactor there is provided an inlet conduit 5 for the introduction at temperatures of from ambient to 400° F. of the combustion gas, suitably oxygen. The bottom of the reactor is also provided with a second inlet conduit 6 for the introduction of the molybdenite feed. The feed is introduced through inlet conduit 6 by means of a screw feeder 7, which carries the feed upwardly in a highly subdivided condition. Typical particle sizes for the molybdenite feed average less than 20 mesh (U.S. standard sieve). The feed inlet conduit 6 terminates in a cup-shaped vessel 8 in the vicinity of the terminal 9 of the combustion gas conduit 5. In this manner the conveyed material comes into direct contact with the combustion gas and sublimes. The feed is preheated to 600–700° F. by having the feed conduit 6 surrounded by heating element 10 in the area within the reaction tube and especially in the area adjacent the cup-shaped vessel 8. In the region of the reactor 1 from the cup-shaped vessel upward there are provided therearound electric heating elements 11 to maintain the reaction temperature throughout the vaporization zone at the preferred temperatures of 1600–1700° F. The goose-necked region 12 of the reactor is not heated but cooled. The cooling is caused by a conduit 13 hermetically sealed to the region 12 through which a suitable liquid coolant is introduced. The preferred coolant is liquified sulphur dioxide. The condensed vapors of molybdenum trioxide and the vapors of sulphur dioxide exit via outlet 14 and are separately recovered in appropriate recovery units (not shown) of conventional construction in a manner well known to the person skilled in the art.

From the above description it is quite clear that the only materials which leave the reactor are the sublimate and sulphur dioxide, all other materials, not vaporizable under the operating conditions, falling to the bottom of the reactor tube from whence they are removed continuously as explained hereabove, in order to allow the process to be a continuous one.

EXAMPLE

An experimental furnace quartz reactor was manufactured having the configuration illustrated in the accompanying drawing and measuring 28 inches in height, 6 inches in diameter at its base, 3 inches in diameter at its goose-necked outlet, and ⅛ inch wall thickness. The cooling section at the top measured 10 inches in length. A 1-inch quartz feed conduit was utilized, terminating in a cup-shaped vessel 1 inch high and 3 inches in diameter. An initial seal bed of zircon sand, 4 inches high was employed. A ¼ inch quartz inlet conduit for the oxygen was inserted from the bottom of the reactor, parallel to the feed inlet conduit and terminating in a beak-shaped, substantially horizontal spout positioned immediately above the surface of the cup-shaped vessel. Electric heating elements were wrapped around the feed inlet and energized to give a temperature of 600–650° F. The vertical section of the reactor from the vicinity of the cup-shaped vessel to the cooling uppermost section was heated to 1600–1700° F. by means of electric coil elements surrounding the reactor tube. A one-inch insulation of refractory brick was provided, slightly spaced from the reactor, throughout the heated portions thereof.

Comminuted $MoS_2$ concentrates of particle sizes smaller than 20 mesh (U.S. standard sieve) were fed by means of a screw feeder, at a rate of 124 lbs./hr. The concentrates contained 111.11 lbs. of pure $MoS_2$ (about 90% $MoS_2$) and produced, by the process of the invention, about 100 lbs. of pure $MoO_3$ and 99 lbs. of $SO_2$. The feed was pre-heated, prior to reaching the cup-shaped sublimation zone, to 600–650° F. Oxygen was introduced through its own separate inlet at a temperature of about 400° F. and at a rate of 77.40 lbs./hr. (ratio of concentrates to oxygen, 1.67:1). The rising vapors of $SO_2$ and $MoO_3$ were contacted in the goose-necked portion of the reactor with a stream of liquified $SO_2$ which condensed the $MoO_3$ vapors. An analysis of the products obtained showed that only $MoO_3$ and $SO_2$ were present, with the exception of very minute amounts of water, oxygen and chlorine. No trace of silica, magnesia, iron, alumina and copper was found, although these are common constituents of molybdenum sulphide ore concentrates.

What I claim and wish to secure by Letters Patent of the United States is:

1. A process of preparing molybdenum trioxide of high purity from molybdenum-bearing ore concentrates, which comprises:
    (a) continuously introducing in the lower region of a sealed reactor a molybdenum-bearing ore concentrate having a particle size smaller than about 20 mesh;

(b) continuously and separately introducing into the said lower region of said reactor through a separate inlet a stream of oxidizing gas at a temperature of from ambient to about 400° F.;

(c) contacting in said lower region said concentrate with said oxidizing gas at a temperature of about 1600–1700° F. to cause oxidation and substantially instantaneous sublimation of the molybdenum values to molybdenum trioxide;

(d) maintaining the reactor at a temperature sufficient to cause the molybdenum trioxide to rise toward the upper region in the reactor, wherein the non-sublimable components of the concentrate fall to the bottom of the reactor to maintain a gas-seal therein and are removed therefrom by mechanical means at such a rate as to maintain a substantially constant level at the bottom of the reactor;

(e) contacting the sublimed molybdenum trioxide in said upper region with a coolant medium comprising liquid sulfur dioxide or molybdenum pellets to cause condensation of the sublimate; and (f) separating the condensed molybdenum trioxide from un-condensable gases associated therewith.

2. The method of claim 1, wherein the introduction of the ore concentrate is effected from the bottom of the reactor and by mechanical screw-feeding means.

3. The method of claim 1, wherein said ore concentrate is heated to about 600–700° F. prior to contacting the oxidizing gas in the reactor.

4. The method of claim 1, wherein the oxidizing gas is oxygen.

5. The method of claim 1, wherein said coolant medium is liquified sulphur dioxide.

6. The method of claim 1, wherein said coolant medium is a bed of molybdenum pellets.

References Cited
UNITED STATES PATENTS

| | | | |
|---|---|---|---|
| 3,139,326 | 6/1964 | Costello | 423—59 |
| 1,426,602 | 8/1922 | Robertson | 423—59 |
| 2,958,587 | 11/1960 | Grimes | 423—59 UX |

HERBERT T. CARTER, Primary Examiner

U.S. Cl. X.R.

23—284; 423—55, 606